Dec. 19, 1922.
W. R. FOX ET AL.
PIPE CUTTER.
FILED JULY 31, 1920.
1,438,991.
4 SHEETS—SHEET 1.
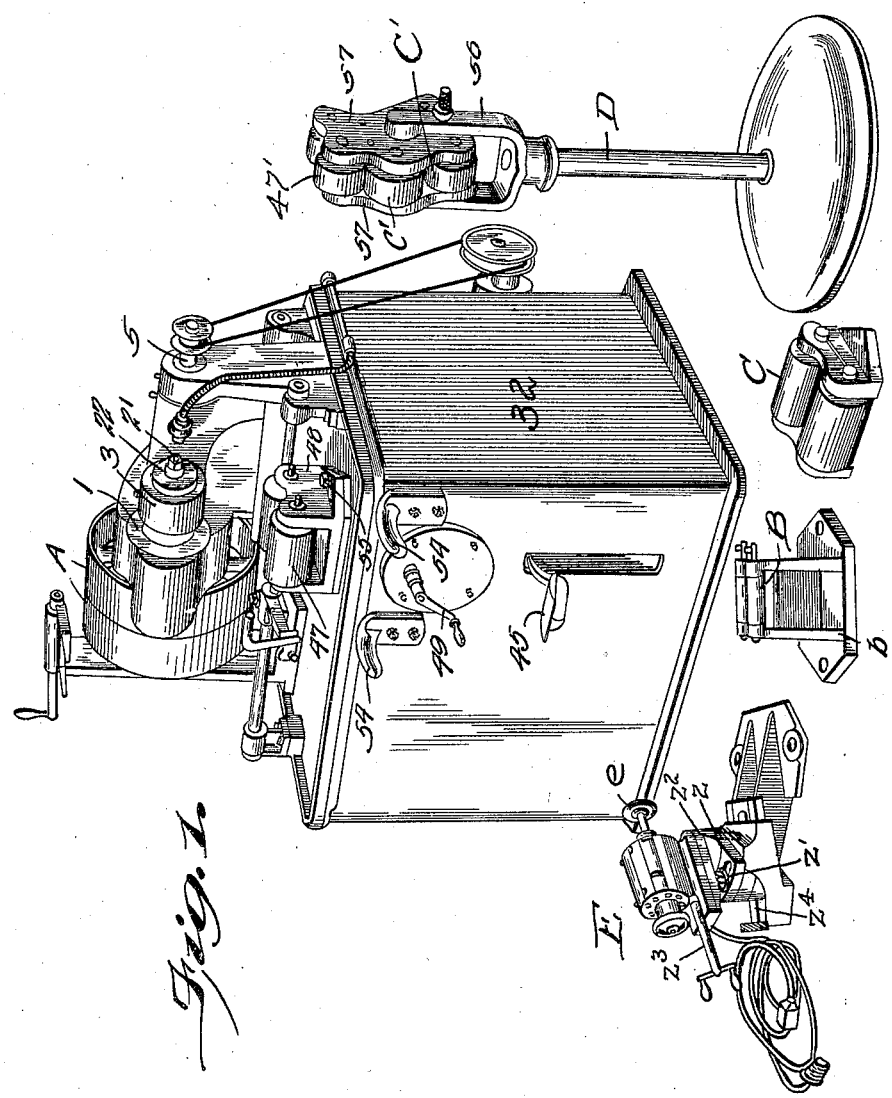
Inventor
Wm. R. Fox
Howard D. Corwin
Witness

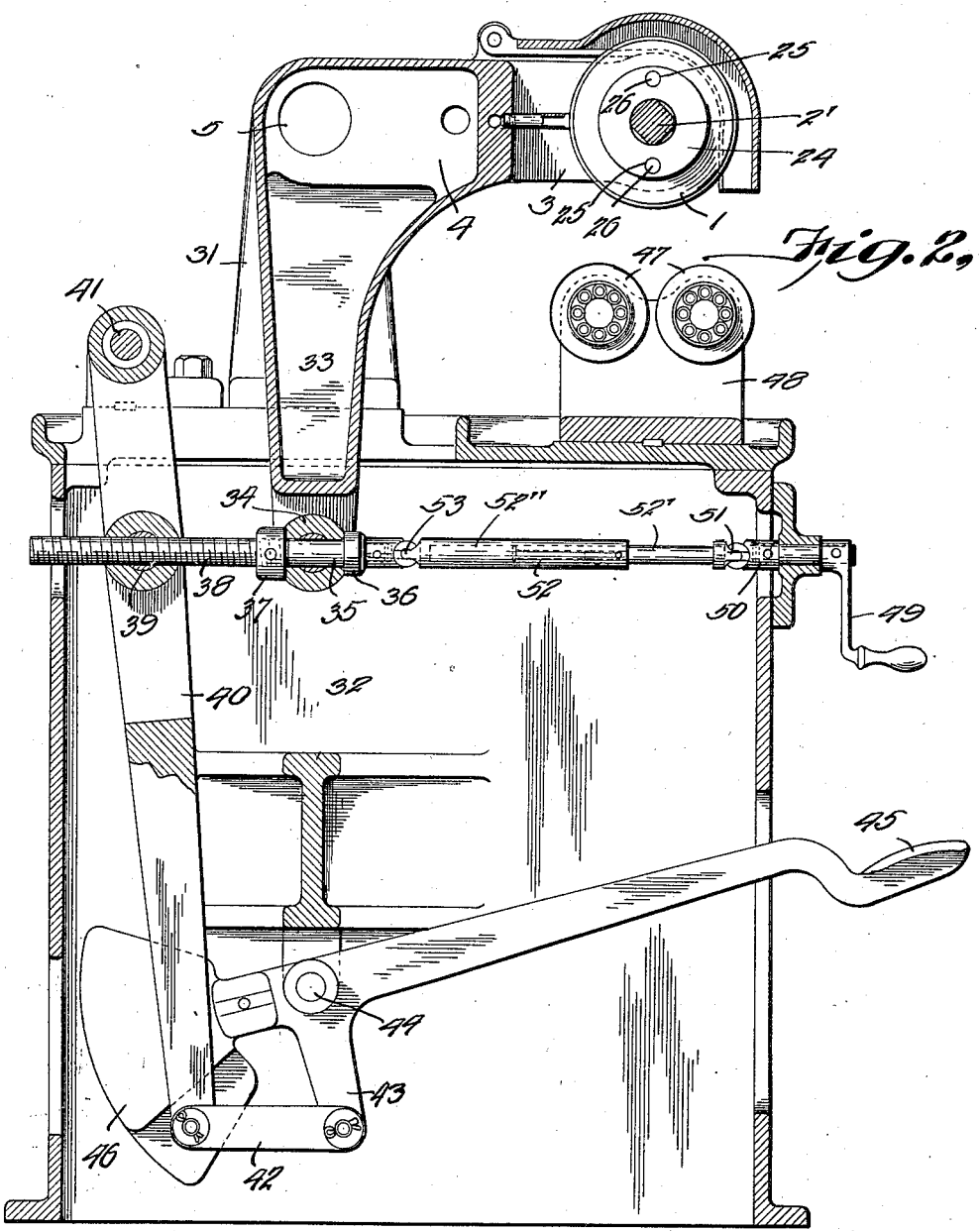

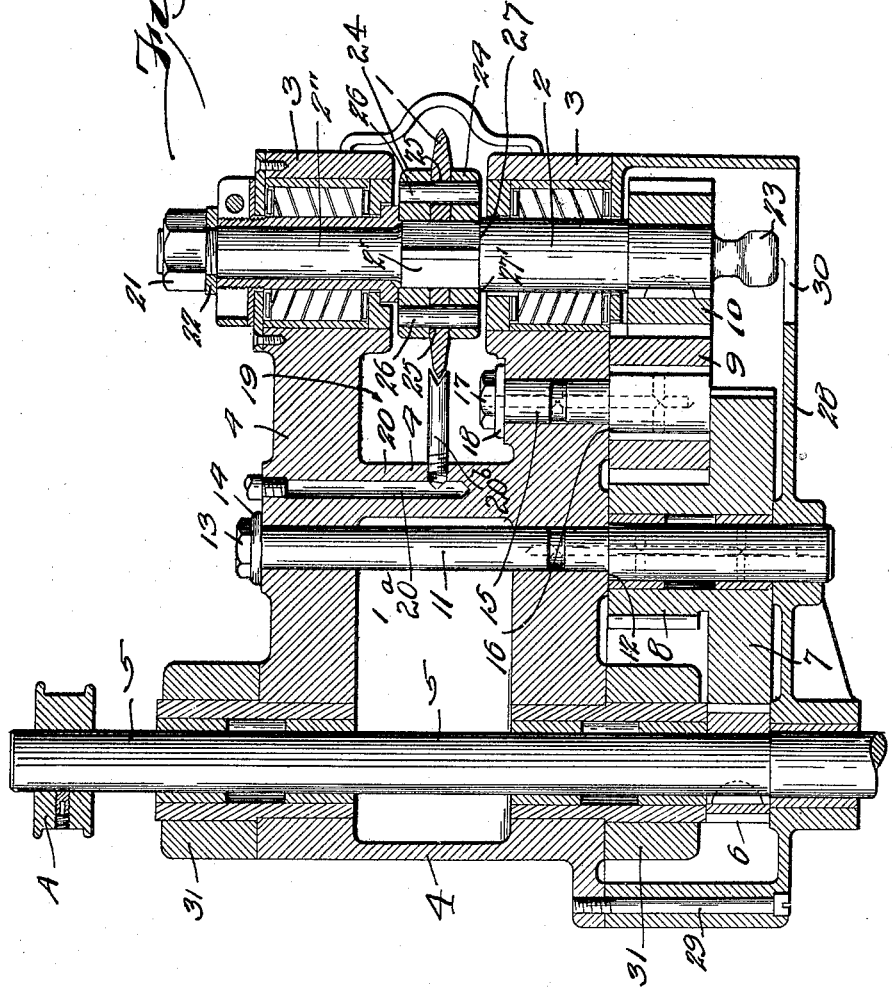

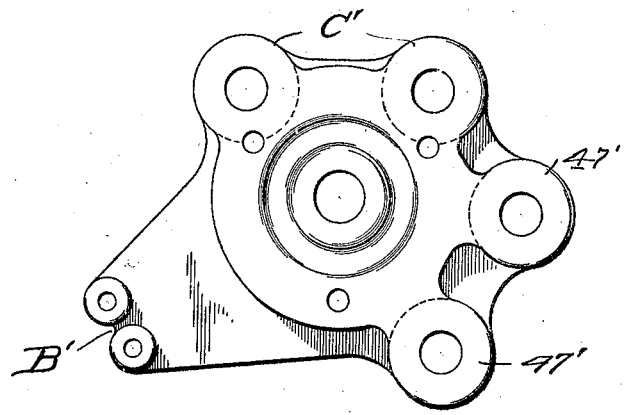
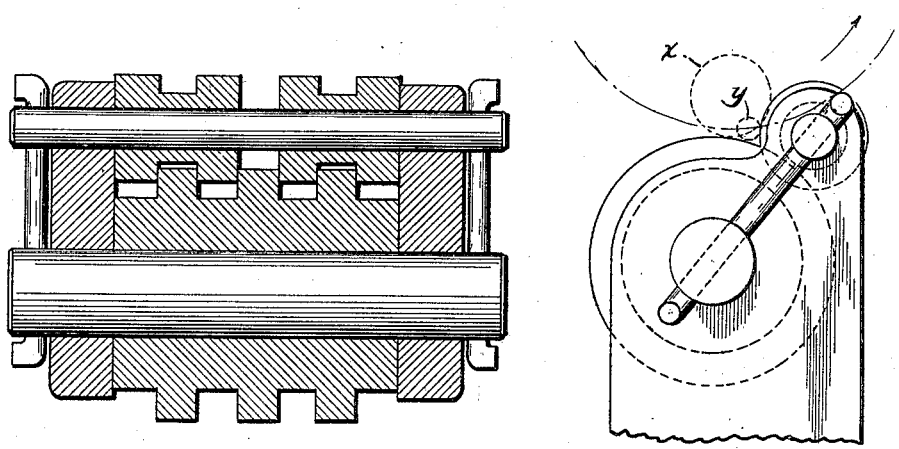

Patented Dec. 19, 1922.

1,438,991

UNITED STATES PATENT OFFICE.

WILLIAM R. FOX AND HOWARD D. CORWIN, OF JACKSON, MICHIGAN, ASSIGNORS, BY DIRECT AND MESNE ASSIGNMENTS, TO FOX MACHINE COMPANY, OF JACKSON, MICHIGAN, A CORPORATION OF MICHIGAN.

PIPE CUTTER.

Application filed July 31, 1920. Serial No. 400,331.

*To all whom it may concern:*

Be it known that we, WILLIAM R. FOX and HOWARD D. CORWIN, citizens of the United States, and residents of Jackson, Michigan, have invented certain new and useful Improvements in Pipe Cutters, of which the following is a specification.

The invention relates to pipe cutters and consists in the features and combination and arrangement of parts hereinafter described and particularly pointed out in the claims.

In the accompanying drawings Figure 1 is a perspective view of the complete equipment.

Fig. 2 is a vertical sectional view from front to rear of the cutting machine.

Fig. 3 is a horizontal sectional view through the cutter and the swinging frame carrying the same and the power transmission gearing.

Fig. 4 is a side view of the head of the auxiliary pipe support.

Fig. 5 is a side view of pipe supporting means.

Fig. 6 is a sectional plan view of the pipe supporting means of Fig. 5.

In these drawings the cutter 1 is shown mounted on an arbor 2 which has its bearings in the two arms 3 of a frame 4 which is mounted coaxially with shaft 5. The frame 4 has sleeves pressed into the same which turn in bearings afforded by the standards 31. The shaft is the drive shaft from which power is transmitted to the arbor of the cutter through the train of gears 6, 7, 8, 9, 10. The gear 6 is keyed on the said drive shaft, and meshes with the gear 7 forming the larger part of the double gear of which the smaller part is shown at 8. These gears 7 and 8 turn about a journal pin or rod 11 which is shouldered at 12 to bear against the side of the swinging frame or arm, the said rod being held by a nut 13 and washer 14, which latter bears on the opposite side of the swinging frame.

The smaller gear 8 meshes with the gear 9 mounted on a pin or rod 15 shouldered at 16 to bear on one face of the swinging frame or arm, which pin is held in place by a nut 17 and washer 18. This pin does not go entirely through the swinging frame but only into the interior recess or opening 19 therein. The nut, however, is exposed in this opening so that it can be manipulated.

The bolt or rod 11, however, extends through the frame or swinging arm.

The two arms 3 of the swinging frame are joined integrally at 20.

The gear 10 is keyed to the arbor 2, and this arbor is removably held in the frame arms 3 by a nut and washer 21, 22. When this nut is removed the arbor 2 can be pulled out, for which purpose it has a handle or knob 23 and the cutter will then drop out.

The arbor is of square or rectangular formation at 2', and the cutter has a round hole in it fitting over this square portion, the diagonal of which is slightly greater than the diameter of the portion 2" of the arbor. The cutter is held by collars 24, one on each side, which have square holes in them fitting on the square part of the arbor. The cutter has holes 25 into which pins 26 carried by one of the collars project. The arbor is shouldered at 27 to hold the collar and cutter arrangement.

The train of gearing is enclosed in a housing 28 which is screwed to the swinging arm at 29 and is hung on the shaft 5 and is also held on the swinging arm by engaging the bolt or rod 11. The housing is open at 30 so that access may be had to the knob 23 for withdrawing the arbor. The shaft 5 may be driven by a belt and pulley, the usual fixed and idle pulley being shown at A, Fig. 1, or this shaft may be driven through suitable connections leading from an electric motor mounted on the main frame. The shaft 5 has its bearings in sleeves of the frame 4 which bear in the standards 31 extending up from the main frame 32. The swinging frame or arm has a depending arm or portion 33 extending down into the main frame or base, the lower end of which has a block 34 pivoted or journalled therein which receives a rod 35, the rod being positioned in said block by a collar 36 thereon bearing on the block and a collar 37 pinned on the screw threaded extension 38. This extension passes through a bearing 39 on a lever 40 pivoted at its upper end at 41 and having its lower end connected by a link 42 to a lever 43, pivoted at 44 and extending forward, and having a foot pedal 45 at its front end. The lever is counter weighted at 46.

Downward pressure from the foot of the operator exerted on the treadle will cause the rocking of the frame or arm 3, 33, so as to bring the revolving cutter down to act on the pipe resting on the rollers 47, carried by a stand 48 removably mounted on the base of the machine and when the cutting has been performed the frame or swinging arm will be restored to its elevated position by the counterweight 46. Both of the bearings 34 and 39 are turnable to accommodate the different relative positions assumed by the arm 33 and lever 40 in swinging from different centers.

In order to initially set or adjust the cutter carrying arm 3 so that the uppermost position of the cutter may be varied we employ a hand crank 49 at the front of the machine, on a shaft section 50 connected by a universal coupling 51 with a shaft section 52 which is in turn connected through a universal joint 53 with the rod or shaft 35 before mentioned. By turning this hand crank the screw threaded extension 38 will be rotated and the extension will screw itself through the block or bearing 39 which now acts as a nut. This will move the lower end of the arm 33 either forward or backward according to the direction in which the hand crank 49 is turned, and hence the cutter may be initially set at different elevations so that if small diameter pipes are being cut the cutter will be set low and the operator will not have to press the pedal 45 so far down as will be the case if a large pipe is being cut in which case the cutter would be initially set higher.

The shaft portion 52 is composed of two sections 52′, 52″ one slipping in the other so that the arm 33, 3 may swing back and forth but yet the connection is maintained between the adjusting means 38 and the crank 49 so that the cutter carrying arm may be set in its different initial positions.

We have provided two handles at 54 which will assist the operator in bearing down on the foot pedal. The leverage is such that the ratio is 20 to 1, that is, a pressure of one hundred pounds on the pedal will give two thousand pounds at the cutter.

Our equipment also includes means whereby the pipes may be supported at different heights from the top of the main frame or base and hence in relation to the cutter. It will be understood that in order to cut pipes varying so greatly in diameter from $\frac{3}{8}''$ to $6''$ it is not desirable to have an equipment which will require the cutter to move vertically a distance of $5\frac{1}{2}''$ or $6''$. Neither is it good construction to have a pipe support adjusted vertically. Furthermore the rollers upon which the pipe rests should be spaced apart according to the diameter of the pipe which is to rest thereon. For large diameters the rolls should be spaced apart further than for smaller diameter pipes. We therefore provide, as a part of the present apparatus a plurality of stands of pipe supporting rolls of different diameters, different spacing and of different heights. These different stands of rolls are shown in Figure 1 at B, C, and 47, the latter being in position on the base of the machine. The rolls 47 are held in a bracket 48 removably secured to the base of the machine by bolts, one of which is shown at 55. The stand of rolls B is for small size pipe and hence the rolls are of small diameter, their axes are close together and the bracket $b$ which carries them at its upper end is a high bracket.

That for the rolls 47 is the next lowest stand, and the stand of rolls C is the lowest and its rolls are of larger diameter than either of the other sets.

Either stand may be quickly attached to the base of the machine or removed therefrom and another one put in its place. No adjustment of the rolls is needed and in changing from one diameter of pipe to another it is only necessary to select the stand of rolls belonging to that diameter of pipe it is intended to cut and place this on the machine, thus facilitating the carrying on of the work in an accurate and predetermined way. This avoids adjustment on the operator's part who may be a comparatively unskilled man.

In order to furnish a support for the outer end of the pipe we have provided a stand D carrying the supporting rolls. While this forms a part of my present organization I prefer to make this stand as an element separate from the main base 32 of the machine. It carries at its upper end a fork 56 in which are journaled plates 57. These plates have a plurality of sets of rolls journaled therein marked B′, C′, and 47′. These rolls are respectively companion sets to the sets B, C, and 47.

The plates 57 may be turned in the forks to bring either pair of rolls uppermost to afford a support for the outer end of the pipe according to its diameter.

In Figs. 5 and 6 we show supporting rolls for the pipes having ribs and recesses, the two rolls interlocking as shown in Fig. 6. With this arrangement it is possible to cut the smallest pipe that is laid onto the rolls. The centers of the rolls and the positions of the rolls, as shown in Fig. 5, in relation to the cutter, is such that with the cutter revolving in the direction of the arrow in Fig. 5 it tends to hold the tube in position while it is being cut. The maximum diameter of pipe which this construction will accommodate is shown at $x$ and the minimum at $y$.

We have also provided means whereby the cutter may be ground, and we have shown at E a grinding attachment which may be bolted in place of the stand of pipe supporting rolls, and used for sharpening the cutter. This grinder has various adjustments, as shown, by which the grinding wheel *e* may be properly located against the cutter for sharpening the same.

As before stated, the shaft 52 is composed of two sections, one slipping in the other, and these two sections may be connected in any suitable way, as by a key located in one of the members and slidable in a groove in the other member.

In Fig. 3, we show means for conducting lubricant to the edge of the cutting tool, this involving a passageway $20^a$ in the arm 4 and a pipe $20^b$ connecting with said passageway and having a forked end embracing the edge of the cutter. The lubricant may be conveyed to the passage $20^a$ by any suitable flexible connection and the lubricant after being delivered to the edge of the cutter will run down into a receiving chamber in the base of the machine to be pumped back through the flexible connection and passage just referred to.

The grinding attachment is so constructed that the grinding wheel may be swung from one side to the other side of cutter so as to grind the proper angle thereon. For this purpose the bracket carrying the grinding wheel and motor may turn about the pivot $z$ so that the grinding wheel may be swung from one side to the other of the cutter. $z'$ indicates the screw that holds the swivel block or bracket $z^2$ in its extreme position. The screw $z^3$ will advance or retract the motor and grinding wheel so that the grinding wheel may be passed over the edge of the cutter to be sharpened and there is also a screw $z^4$ by which the swivel block and grinding wheel may be adjusted to determine the amount of cut and this compensates for the difference in diameter between the cutter disc and the grinding wheel.

Referring to the cutter this as stated has a round hole. One reason for this is that the cutter being narrow, the pressure would cause it to cut into the shaft and destroy its driving power. Another reason is that it is more difficult to make the cutter with a square hole and have it run true. Even though the corners are well rounded, when the cutter is hardened, contraction and expansion is apt to start a crack in the corner. We therefore drive the cutter from the two collars by means of the pins 26. These pins are mounted in one of the collars and extend through the cutter and into the opening in the other collar and both collars serve as driving means because they are mounted on the square portion of the shaft, each having a square opening for this purpose.

What we claim is:—

1. A pipe cutter comprising a support for the pipe, a cutter, a swinging frame having a substantially horizontal arm on which the cutter is mounted and a depending arm, a drive shaft at the junction of said arms on which said swinging frame turns, gearing between said drive shaft and the cutter and a treadle with connections to the depending arm, substantially as described.

2. In combination in a pipe cutter a drive shaft, a frame turnable about the drive shaft and having two arms, an arbor journaled in said arms, a disc cutter encircling the arbor between the arms but free from driving contact therewith, said arbor having a rectangular portion receiving the cutter and collars at the sides of the cutter having rectangular openings to fit the rectangular portion of the arbor, said collars driving the cutter, said arbor being removable from the arms of the frame and from the cutter and collars, substantially as described.

3. In combination in a pipe cutter a swinging frame having arms, an arbor mounted in the arms having a shoulder and a portion adjacent the said shoulder rectangular in cross section, a cutter encircling the arbor, but free from driving contact therewith, collars at the side of the cutter mounted on the rectangular portion and having rectangular openings to fit said portion and means connecting the cutter with one of the collars so that the cutter is driven by the collar, substantially as described.

4. In combination in a pipe cutter a swinging frame having arms to receive a cutter between them, an arbor mounted in the arms having a shoulder, a rectangular portion adjacent the said shoulder and located between the arms of the frame, a cutter mounted on the rectangular portion, a driving collar alongside the cutter and bearing against said shoulder, a second shoulder on the arbor carrying a bearing portion for the said second shoulder, one of the arms and means for holding the arbor removably in place and driving means for the arbor on the outer side of one of the arms and mounted on the arbor, substantially as described.

5. In combination a swinging frame having arms to receive a cutter between them, an arbor mounted in the arms, a cutter on the arbor, a drive shaft about which the swinging frame is turnable, gearing between the drive shaft and the arbor of the cutter, pins upon which a part of said gearing is mounted on the outer side of one of the arms and a housing secured to the swinging arm turnable therewith about the drive shaft and held by a projection of one of the said pins on the outer side of one of the arms, said housing enclosing the gearing, substantially as described.

6. In combination in a pipe cutter, a base, a swinging frame carrying the cutter and having a portion depending below the top of the base, a lever for operating the frame and means for adjusting the frame in relation to the lever whereby the initial position of the cutter may be determined, said lever and adjusting means being mounted on the base and connected with the depending portion of the swinging frame, substantially as described.

7. In combination in a pipe cutter, a rest for the pipe, a swinging frame carrying the cutter, a base or stationary frame upon which the swinging frame is mounted, foot operated lever mechanism mounted on the stationary frame, a connection between the lever mechanism and the swinging frame and hand operated means mounted on the stationary frame for adjusting the said connection between the lever mechanism and the swinging frame, substantially as described.

8. In combination in a pipe cutter, a rest for the pipe, a swinging frame carrying the cutter, a base or stationary frame upon which the swinging frame is mounted, lever mechanism mounted on the stationary frame, a connection between the lever mechanism and the swinging frame and means mounted on the stationary frame for adjusting the said connection between the lever mechanism and the swinging frame, said means including a crank and a flexible shaft between the said crank and the said connections, substantially as described.

9. In combination in a pipe cutter, a rest for the pipe, a swinging frame carrying the cutter, a base or stationary frame upon which the swinging frame is mounted, lever mechanism mounted on the stationary frame, a connection between the lever mechanism and the swinging frame and means mounted on the stationary frame for adjusting the said connection between the lever mechanism and the swinging frame, said means including a crank and a flexible shaft between the said crank and the said connections, said flexible shaft being extensible, substantially as described.

10. In combination in a pipe cutting machine, a rest for the pipe, a cutter, a swinging frame carrying the said cutter, said frame having a depending arm, a main base frame, a lever mounted thereon and depending from its pivot, a connection between the said lever and the depending arm of the swinging cutter frame, said connection extending from the lower end of the depending arm to a point in the depending lever below the pivot thereof, and a treadle connected with the depending lever, substantially as described.

11. In combination in a pipe cutting machine a rest for the pipe, a cutter, a swinging frame carrying the said cutter, said frame having a depending arm, a main base frame, a lever mounted thereon and depending from its pivot, a connection between the said lever and the depending arm of the swinging cutter frame, a treadle connected with the depending lever, and hand power means, with a power transmitting device extending to said connection for adjusting the connection between the depending lever and the depending arm of the swinging frame to initially set the cutter in relation to the pipe support, substantially as described.

12. In combination in a pipe cutting machine a main base frame, a swinging frame mounted thereon and carrying a cutter, said swinging frame having a depending arm, a lever pivoted at its upper end to the main frame and depending therefrom, a screw rod connection between the lever and the depending arm of the swinging frame, a flexible and extensible shaft connected with the screw rod and extending substantially coaxially therewith, means for turning the flexible shaft for turning the screw rod and to adjust the depending lever and the depending arm in relation to each other to set the cutter initially, and means for operating the depending lever, substantially as described.

13. In combination in a pipe cutting machine a rest or support for the pipe, a main base frame, a swinging frame, a cutter mounted in the swinging frame, a treadle mounted on the main base frame, adjustable means connecting the treadle with the swinging frame and means journaled on the base frame at a point above the treadle having power transmitting connections extending therefrom to the said adjustable connecting means for adjusting the swinging frame initially to set the cutter, substantially as described.

14. In combination in a pipe cutting apparatus, a cutter, a movable support therefor, means for operating the support to move the cutter to and from its work, and a plurality of sets of rollers for supporting the pipe, and brackets for supporting the said rollers there being a bracket for each set of rollers and means for attaching the brackets to the base frame of the apparatus, said brackets being of different heights and the sets of rollers being interchangeable to be fixed at one point on the main base frame to accommodate pipe of different diameters, the rollers of one set being of different diameter from the rollers of the other set, the smaller diameter rollers being mounted in the higher bracket and with their axis nearer together than the larger diameter rolls, substantially as described.

15. In combination in an apparatus for cutting pipe, a main base frame, a swinging frame mounted thereon, a cutter carried by the swinging frame, means for swinging said frame, a plurality of interchangeable stands of rollers to be mounted on the main base frame, said stands of rollers varying in height and as to diameter, of the rolls to accommodate pipes of different diameters, the smaller diameter rollers being at a higher elevation and closer together as to their centers than the larger diameter rollers, and an auxiliary supporting means for the outer end of the pipe, comprising a plurality of sets of rollers of different diameters corresponding to the interchangeable sets first mentioned permanently set as to spacing of their centers, and means for supporting the auxiliary rollers to be set to accord with the particular stand of rollers on the base frame, substantially as described.

16. In combination in an apparatus for cutting pipe, a main base frame, a swinging frame mounted thereon, a cutter carried by the swinging frame, means for swinging said frame, a plurality of interchangeable stands of rollers to be mounted on the main base frame, said stands of rollers varying in height and as to diameter of the rolls to accommodate pipes of different diameters, the smaller diameter rollers being at a higher elevation and closer together as to their centers than the larger diameter rollers, and an auxiliary supporting means for the outer end of the pipe comprising a plurality of sets of rollers of different diameters corresponding to the interchangeable sets first mentioned permanently set as to spacing of their centers, means for supporting the auxiliary rollers, said supporting means including a stand and a carrier for the plurality of sets of rollers, said carrier being turnable in relation to the stand to bring the desired set of rollers in position, to support the outer end of the pipe, substantially as described.

17. In combination in a pipe cutter, a swinging frame, a cutter mounted thereon and a pair of rolls for supporting the pipe, said rolls having annular ribs and recesses with the ribs of one roll interlocking with the recess of the other and a space in one roll receiving the edge of the cutter, substantially as described.

18. In combination in a pipe cutting machine a cutter a support therefor, a pair of rolls for supporting the pipe, said rolls having their pipe supporting peripheries intersecting, the cutter operating through a space in one of the rolls, substantially as described.

19. In combination in a pipe cutting machine, a cutter, a support therefor, a pair of rolls for supporting the pipe consisting of a large and a small roll with their pipe supporting peripheries intersecting and with a space in the small roll receiving the cutter, substantially as described.

20. In a pipe cutter or the like, an arbor having a portion rectangular in cross section, a cutter having a round opening and located on said rectangular portion, and a collar having a rectangular opening to fit the rectangular portion of the arbor alongside the cutter and a pin extending from the collar into the cutter to drive the same upon rotation of the arbor, substantially as described.

In testimony whereof, we affix our signatures.

WILLIAM R. FOX.
HOWARD D. CORWIN.